2,898,375
CYCLIC KETONES AND PROCESS FOR PREPARING INTERMEDIATES THEREFOR

Waldemar Guex and Otto Isler, Basel, Switzerland, assignors to Hoffmann-La Roche Inc., Nutley, N.J., a corporation of New Jersey No Drawing. Application September 29, 1955
Serial No. 537,561

Claims priority, application Switzerland October 5, 1954

5 Claims. (Cl. 260—586)

The present invention relates to a process for the preparation of unsaturated ketones which comprises substituting a hydrocarbon radical having from one to three carbon atoms in the activated methylene group of an acetoacetate of the general formula:

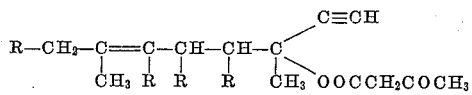

wherein R represents hydrogen or the methyl radical, at least three of the groups designated R being hydrogen; heating the substituted acetoacetate obtained to effect rearrangement and liberation of carbon dioxide; and treating the resulting substituted triply unsaturated ketone with an acidic reagent, thereby effecting cyclization.

Suitable starting materials are, for example, the acetoacetates of the following acetylenic carbinols:

1-ethinyl-1,5-dimethyl-hexen-(4)-ol-(1)
1-ethinyl-1,5-dimethyl-hepten-(4)-ol-(1)
1-ethinyl-1,4,5-trimethyl-hexen-(4)-ol-(1)
1-ethinyl-1,3,5-trimethyl-hexen-(4)-ol-(1)
1-ethinyl-1,2,5-trimethyl-hexen-(4)-ol-(1)

The hitherto unknown 1-ethinyl-1,5-dimethyl-hepten-(4)-ol-(1) can be prepared as follows:

600 g. of 3-methyl-penten-(1)-ol-(3) were cooled to +15° C. with an ice bath, then 1800 cc. of concentrated aqueous hydrochloric acid (37%) were poured into the reaction vessel. The mixture was stirred for 30 minutes. The oil, comprising essentially 1-chloro-3-methyl-pentene-(2), was separated, washed three times with 500 cc. of water and dried over calcium chloride.

Four liters of benzene, 1040 g. of ethyl acetoacetate and 378 g. of sodium methylate were stirred into a 12 liter flask. 696 g. of 1-chloro-3-methyl-pentene-(2) as produced in the preceding paragraph was added from a separatory funnel in 2 hours at 60° C. The stirring was then continued at 60° C. overnight.

The mixture was diluted with four liters of water. The oil was separated and the benzene was distilled off under vacuum. The thick residue, 3 - carbethoxy - 6-methyl-octen-(5)-one-(2) was placed in a 5 liter flask with 2 liters of ethyl alcohol, 1 liter of water and 500 grams of potassium hydroxide. This was stirred for two hours, then allowed to set overnight, thereby forming the potassium salt of 3-carboxy-6-methyl-octen-(5)-one-(2).

Concentrated hydrochloric acid was added to the stirred reaction mixture from a separatory funnel until strongly acid. The oil layer was removed, and the aqueous portion was extracted with one liter of benzene. The combined oils were water washed and fractionated to yield 6-methyl-octen-(5)-one-(2), distilling at 65° C./10 mm., $n_D^{25}=1.4412$.

84 g. of metallic sodium was dissolved in 3 liters of liquid ammonia. Acetylene was bubbled into the stirred solution until its color changed from blue to a white. 420 g. of 6-methyl-octen-(5)-one-(2) was dissolved in 500 cc. of diethyl ether and dropped into the stirred reaction mixture in one hour. Stirring was then continued for 3 hours while a slow stream of acetylene was bubbled in. The acetylene was then stopped, but the stirring was continued for about 15 hours. The ammonia was then distilled off and the residue in the reaction vessel was washed with 2 liters of 5% aqueous sulfuric acid. The product was then water washed, dried over anhydrous calcium sulfate and fractionated to yield 1-ethinyl-1,5-dimethyl-hepten-(4)-ol-(1), distilling at 89° C./10 mm., $n_D^{25}=1.4612$.

The acetylenic carbinols can be converted to their corresponding acetoacetates by condensing said carbinols with diketene, generally in accordance with the indications in United States Patent No. 2,661,368.

In the first stage of the reaction, the acetoacetate starting material is substituted at the activated methylene group in the acetoacetic acid moiety of the molecule by introducing a hydrocarbon radical having from 1 to 3 carbon atoms. Examples of such hydrocarbon radicals are: methyl, ethyl, propyl, isopropyl, vinyl, allyl and isopropenyl radicals. The substitution reaction is advantageously effected by condensing a salt of the acetoacetate, e.g. an alkali salt, with the substituting agent, e.g. p-toluene-sulfonic acid alkyl ester, dialkyl sulfate, an alkenyl halide or an alkyl halide. In the preferred mode of execution, the acetoacetate is reacted with alkali alcoholate and the mono-alkali compound of the acetoacetate formed is treated with one mol of alkyl- or alkenyl halide. Advantageously, cooling is applied during the condensation reaction, and, also, temperatures over 50° C. are avoided during the working up of the reaction product. Unreacted starting material, in contrast to the reaction product, can be extracted from the petroleum ether reaction medium by means of ice-cold aqueous NaOH. It is, therefore, advantageous to employ an excess of acetoacetate for the preparation of the alkali compound thereof, and, after the ensuing alkylation or alkenylation step, to regenerate unreacted starting material in the NaOH extracts by acidification with acetic acid and extraction with petroleum ether. In this manner, the formation of α,α-dialkylated- or α,α-dialkenylated-acetoacetates can be avoided in a practical sense. The new α-substituted-acetoacetates obtained are oils which split off $CO_2$ when heated at temperatures above 170° C.

In the next stage of the reaction, the substituted acetoacetates obtained are heated, preferably at 170–190° C. Rearrangement results, with liberation of carbon dioxide, and there are formed triply unsaturated substituted ketones. An advantageous mode of execution comprises heating the acetoacetate, which has been substituted in the α-position, in an inert solvent and in the presence of a weak carboxylic acid, to a temperature of 175–190° C. As inert solvents three may be used, for example, hydrocarbons, such as decalin, or saturated or unsaturated ketones, such as methylheptanone and methylheptenone. As weak carboxylic acids there may be used, for example, aliphatic carboxylic acids, such as acetic acid, propionic acid and acrylic acid, aromatic carboxylic acids, such as benzoic acid, p-hydroxybenzoic acid and salicylic acid, and heterocyclic acids such as nicotinic acid and isonicotinic acid. Nicotinic acid is particularly advantageous.

The purification of the pyrolysis products is suitably effected by fractional distillation, by countercurrent partition in solvents, by extraction of byproducts by means of cold aqueous NaOH solution, and also by conversion to crystalline derivatives which can easily be split up again, for example, semicarbazones.

In Table I are set forth several purified pyrolysis products, with their respective refractive indices, boiling points, absorption maxima, corresponding extinctions, and melting points of the semicarbazone derivatives.

TABLE I

| Ketone | Hydrocarbyl Radical | $n_D^{20}$ | B. P., °C./ mm. Hg | U. V. Abs. Max. | Extinction (in Ethanol) | Semicarbazone, M.P., °C. |
|---|---|---|---|---|---|---|
| 3-Hydrocarbyl-6, 10-dimethyl-undecatrien-(3,5,9)-one-(2) | Methyl | 1.5332 | 88°/0.05 | 294 | 27,800 | 151 and 191 |
| | Ethyl | 1.5270 | 98°/0.1 | 297 | 28,050 | 173-175 |
| | Propargyl | 1.5385 | 110°/0.1 | 294 | 28,700 | 181-182 |
| | Allyl | 1,5345 | 94°/0.05 | 294 | 25,700 | 154 |
| | Propyl | 1,5100 | 88°/0.05 | 295 | 21,100 | 146-147 |
| 3-Hydrocarbyl-6, 10-dimethyl-dodecatrien-(3,5,9)-one-(2). | Methyl | 1.5310 | 92°/0.15 | 294 | 28,200 | 182-184 |
| | Ethyl | 1.5250 | 94°/0.01 | 294 | 26,200 | 163-164 |
| | Propargyl | 1.5 | 102°/0.1 | 294 | 24,000 | 174-175 |
| | Allyl | 1.5320 | 100°/0.05 | 296 | 28,800 | 134-135 |
| 3-Hydrocarbyl-6,9,10-trimethyl-undecatrien-(3,5,9)-one-(2). | Methyl | 1.5300 | 102°/0.1 | 296 | 25,350 | 195 |
| | Propargyl | 1.5388 | 95°/0.05 | 295 | 23,200 | 195-198 |
| | Allyl | 1.5336 | 114°/0.1 | 296 | 26,100 | 176-177 |
| 3-Hydrocarbyl-6,7,10-trimethyl-undecatrien-(3,5,9)-one-(2). | Methyl | 1.5318 | 89°/0.01 | 294 | 27,700 | 164-166 |
| | Allyl | | | | | |

In the third stage of the process, the ketones obtained by the pyrolysis are heated with acidic reagents. Depending upon the specific acidic reagents employed, there are produced cyclic ketones having the nuclear structures of either α- or β-ionone. Thus, end-product ketones having the nuclear structure of α-ionone are obtained if the cyclization treatment is effected by means of syrupy phosphoric acid at room temperature or moderately elevated temperatures, or if boron trifluoride is employed at low temperatures. On the other hand, if concentrated sulfuric acid is employed as the cyclizing agent, there are obtained predominantly cyclization products which possess the nuclear structure of β-ionone. (If, however, a methyl radical has been introduced in the activated methylene group of the acetoacetic ester moiety of the molecule, there are formed upon treatment with sulfuric acid significant proportions of product having the nuclear structure of α-ionone.)

The cyclic ketones obtained according to the invention are useful as odor-imparting agents for the preparation of perfumes. They possess fragrances generally reminiscent of violet and iris.

Some of the products obtained according to the invention are collated in Table II, together with their respective refractive indices, boiling points, and melting points of the semicarbazone.

TABLE II

| α-Ionone Derivatives | No. | Hydrocarbyl Radical | $n_D^{20}$ | B.P. °C./ mm. Hg | Semicarbazone, M. P. °C. |
|---|---|---|---|---|---|
| 4 - [2', 6', 6' - Trimethyl - cyclohexen - (2') - yl] - 3-hydrocarbyl-buten-(3)-one-(2). | 1 | Methyl | 1.5010 | 67°/0.1 | 204 |
| | 2 | Ethyl | 1.4998 | 60°/0.05 | 188-190 |
| | 3 | Propargyl | 1,5154 | 98°/0.1 | 183-186 |
| | 4 | Allyl | 1.5074 | 82°/0.1 | 170-172 |
| | 5 | Propyl | 1.4980 | 63°/0.03 | 169-170 |
| 4 - [2', 6' - Dimethyl - 6' - ethyl - cyclohexen - (2') - yl]-3-hydrocarbyl-buten-(3)-one-(2). | 6 | Methyl | 1,5050 | 75°/0.1 | 190-191 |
| | 7 | Ethyl | 1,5001 | 85°/0.07 | 185-187 |
| | 8 | Propargyl | 1.5173 | 85°/0.03 | 197-198 |
| | 9 | Allyl | 1.5098 | 80°/0.1 | 180-182 |
| 4 - [2', 5', 6', 6' - Tetramethyl - cyclohexen - (2') - yl]-3-hydrocarbyl-buten-(3)-one-(2). | 10 | Methyl | 1.4990 | 78°/0.1 | 200-201 |
| | 11 | Propargyl | 1.5180 | 85°/0.05 | 190-193 |
| | 12 | Allyl | 1.5093 | 80°/0.04 | 190-193 |
| | 13 | Propyl | 1.4975 | 74°/0.05 | 188-190 |
| 4 - [2', 3', 6', 6' - Tetramethyl - cyclohexen - (2') - yl]-3-hydrocarbyl-buten-(3)-one-(2). | 14 | Methyl | 1.5068 | 77°/0.1 | 186-188 |
| | 15 | Allyl | 1.5113 | 78°/0.05 | 186-188 |

Example 1.

*4-[2',6',6'-trimethylcyclohexenyl]-3-methylbuten-(3)-one-(2)*

*Methylation.*—200 parts by weight of 1-ethinyl-1,5-dimethylhexen-(4)-yl acetoacetate were gradually added while cooling to an alcoholic sodium ethylate solution (produced from 23 parts by weight of sodium and 450 parts by volume of absolute ethanol). Then methyl bromide was introduced, while cooling to 15–20° C., until the solution reacted neutral to litmus. The sodium bromide formed was filtered off, the filtrate was concentrated in vacuo and the residue was disoslved in a fourfold amount of petroleum ether (boiling point 40–50° C.). The solution was washed with water, ice cold N sodium hydroxide solution, N acetic acid and again with water, dried, and the solvent distilled off. 230 parts by weight of 1-ethinyl-1,5-dimethylhexen-(4)-yl α-methylacetoacetate were obtained as a yellow oil, $n_D^{20}$=1.4622. 35 parts by weight of unchanged starting material were recovered from the sodium hydroxide solution extracts. The yield of the methylation step amounted to 96%.

*Pyrolysis.*—230 parts by weight of 1-ethinyl-1,5-dimethylhexen-(4)-yl α-methylacetoacetate, together with 120 parts by weight of decalin and one part by weight of acetic acid, were rapidly heated to 185–190° C. and maintained at this reaction temperature for 2 to 3 hours, whereby about 0.8 mol of carbon dioxide was split off. The decalin and volatile byproducts were separated by distillation in a small column under water vacuum. Crude 3,6,10-trimethyl-undecatrien-(3,5,9)-one-(2) was obtained by high vacuum distillation without a column in the boiling range 95–110° C./0.1 mm. 130 parts by weight of a light oil were obtained, $n_D^{20}$=1.5130 with ultraviolet absorption maximum at 293 mμ, $E_1^1$=716 (in ethanol). The crude product is 53% pure on the basis of ultraviolet absorption measurements. The yield of the pyrolysis step amounts to 36.5%.

*Purification.*—The crude product was next dissolved in petroleum ether (750 parts by volume) and washed with methanolic sodium hydroxide solution (30 parts by volume of concentrated sodium hydroxide solution in 200 parts by volume of methanol) and with water. After separation of the solvent the residue was fractionated. A forerun which boiled below 105° C. at 0.05 mm. was first separated by means of a good column and then the main fraction was distilled without a column at 105–110° C./0.05 mm. 83 parts by weight of an almost colorless oil, $n_D^{20}$=1.5255, was obtained with a content of about 80% 3,6,10-trimethyl-undecatrien-(3,5,9)-one-(2). The pure compound, boiling point 88° C./0.05 mm. and $n_D^{20}$=1,5332 with an ultraviolet absorption maximum at 293 mμ, $E_1^1$=1,350 (in ethanol), was obtained by the production and splitting of the semicarbazones, which exist as two homogeneous stereoisomers of melting points 157 and 191° C., respectively.

*Cyclization with sulfuric acid.*—35 grams of 3,6,10-trimethyl-undecatrien-(3,5,9)-one-(2)- dissolved in 30 cc. of petroleum ether (40–50°) were gradually added to a mixture of 52 grams of glacial acetic acid and 120 grams of sulfuric acid (84%) cooled to —10°. After 15 minutes at —10 to —5°, the mixture was stirred for an additional 20 minutes at +10°. In processing the reaction mixture it was poured onto ice and extracted with petroleum ether. The petroleum ether extract was washed with soda solution and water to the neutral point, dried and evaporated. The distillation of the residue in a high vacuum gave 30 grams of cyclization produce, comprising principally 4-[2′,6′,6′-trimethyl-cyclohexen-(1′)-yl]-3-methylbuten-(3)-one-(2), boiling point$_{0.5}$=68°, $n_D^{20}$=1.5020, semicarbazone melting point 192–193°.

*Cyclization with boron trifluoride.*—50 grams of 3,6,10-trimethyl-undecatrien-(3,5,9)-one-(2) were dissolved in 150 cc. of absolute benzene. Boron trifluoride was introduced into the solution while stirring and cooling to 3–5° until 19.5–20 grams were absorbed. Stirring was continued for an additional 15 minutes at 15° and the solution was poured onto ice. The mixture was adjusted to pH 10 with 3 N sodium hydroxide, the aqueous phase was separated, washed again with concentrated sodium hydroxide solution and saturated sodium bicarbonate solution and dried with water-free potassium carbonate. After evaporation of the benzene, the residue was distilled in high vacuum to obtain 45 grams of 4-[2′,6′,6′-trimethylcyclohexen-(2′)-yl]-3-methylbuten-(3)one-(2) as a colorless oil, boiling point$_{0.1}$=67°; $n_D^{20}$=1.5010; semicarbazone melting point 204°.

In an analogous manner, by methylation, pyrolysis, purification and cyclization by means of boron trifluoride, from 1-ethinyl-1,5-dimethyl-hepten-(4)-yl acetoacetate was obtained 4-[2′,6′-dimethyl-6′-ethylcyclohexen-(2′)-yl]-3-methylbuten-(3)-one-(2), B.P.$_{0.1}$=75°, $n_D^{20}$=1.5050, semicarbazone melting point 190–191°; from 1-ethinyl-1,4,5-trimethylhexen-(4)-yl acetoacetate was obtained 4-[2′,5′,6′,6′-tetramethylcyclohexen-(2′)-yl]-3-methylbuten-(3)-one-(2), boiling point$_{0.1}$=78°, $n_D^{20}$=1.4990, semicarbazone melting point 200–201°; and from 1-ethinyl-1,2,5-trimethylhexen-(4)-yl acetoacetate was obtained 4-[2′,3′,6′,6′-tetramethylcyclohexen-(2′)-yl]-3-methylbuten-(3)-one-(2), boiling point$_{0.1}$=77°, $n_D^{20}$=1.5068, semicarbazone melting point 186–188°.

*Example 2.—4-[2′,6′,6′-trimethylcyclohexen-(2′)-yl]-3-allylbuten-(3)-one(2)*

*Allylation.*—283 parts by weight of 1-ethinyl-1,5-dimethylhexen-(4)-yl acetoacetate were gradually added while cooling to a sodium ethylate solution (prepared from 23 parts by weight of sodium and 450 parts by volume of absolute ethanol). 121 parts by weight of allyl bromide were slowly added while cooling to 15–20° C. and the procedure described in Example 1 was then followed exactly. 250 parts by weight of 1-ethinyl-1,5-dimethylhexen-(4)-yl- α-allylacetoacetate $n_D^{20}$=1.4708, were obtained as a yellowish oil. 47 parts by weight of unchanged starting material were recovered from the sodium hydroxide solution extracts. The yield in the allylation step amounted to 90%.

*Pyrolysis.*—250 parts by weight of 1-ethinyl-1,5-dimethylhexen-(4)-yl α-allylacetoacetate were heated to 185–190° C. with 130 parts by weight of decalin and one part by weight of nicotinic acid. The mixture was held at this reaction temperature for 2 to 3 hours whereupon about 0.8 mol of carbon dioxide was split off. The decalin and volatile byproducts were separated by distillation in a small column under water vacuum and the crude 3-allyl-6,10-dimethyl-undecatrien-(3,5,9)-one-(2) was obtained by high vacuum distillation without a column in the boiling range 100–120° C./0.1 mm. There were obtained 149 parts by weight of a yellow oil, $n_D^{20}$=1.5140 with ultraviolet absorption maximum at 294 mµ, $E_1^1$=464 (in ethanol). The crude product is 42% pure on the basis of ultraviolet absorption measurements. The yield of the pyroylsis step amounts to 30%.

*Purification.*—By proceeding according to the method of Example 1, pure 3-allyl-6,10-dimethyl-undecatrien-(3,5,9)-one-(2) of boiling point 94° C./0.05 mm. and $n_D^{20}$=1.5345 with ultraviolet absorption maximum at 293 mµ, $E_1^1$=1105 (in ethanol) was obtained by the production and splitting of the semicarbazone of melting point 154° C.

*Cyclization with phosphoric acid.*—10 parts by weight of 3-allyl-6,10-dimethyl-undecatrien-(3,5,9)-one-(2) were dissolved in 10 cc. of benzene and were added dropwise at room temperature under nitrogen to 70 cc. of phosphoric acid (86%). The mixture was stirred for 70 minutes and poured onto 300 cc. of ice water. The mixture was extracted with petroleum ether, the extract was washed to the neutral point, dried and evaporated. By distillation there was obtained 7.3 parts by weight of 4-[2′,6′,6′-trimethylcyclohexen-(2′)-yl]-3-allylbuten-(3)-one-(2), $n_D^{20}$=1.5070, boiling point$_{0.1}$=75°, semicarbazone melting point 172–173°.

In a similar manner, from 1-ethinyl-1,5-dimethylhepten-(4)-yl acetoacetate was obtained 4-[2′,6′-dimethyl-6′-ethylcyclohexen-(2′) - yl] - 3-allylbuten-(3)-one-(2), boiling point$_{0.1}$=80°, $n_D^{20}$=1.5098, semicarbazone melting point 180–182°; from 1-ethinyl-1,4,5-trimethylhexen-(4)-yl acetoacetate was obtained 4-[2′,5′,6′,6′-tetramethylcyclohexen-(2′)-yl]-3-allylbuten-(3) - one - (2), boiling point$_{0.04}$=80°, $n_D^{20}$=1.5093, semicarbazone melting point 190–193°; and from 1-ethinyl-1,3,5-trimethylhexen-(4)-yl acetoacetate was obtained 4-[2′,3′,6′,6′-tetramethylcyclohexen-(2′)-yl]-3-allylbuten-(3)-one-(2), boiling point$_{0.05}$=78°, $n_D^{20}$=1.5113, semicarbazone melting point 186–188°.

*Example 3.—4-[2′,5′,6′,6′ - tetramethylcyclohexenyl]-3-methylbuten-3-one-2*

*Methylation.*—275 parts by weight of 1-ethinyl-1,4,5-trimethylhexen-(4)-yl acetoacetate were gradually added while cooling to an alcoholic sodium ethylate solution (prepared from 23 parts by weight of sodium and 450 parts by volume of absolute ethanol). Then methyl bromide was introduced while cooling to 15–20° C. until the solution reacted neutral to litmus. Processing of the reaction mixture followed exactly the description in Example 1. 254 parts by weight of 1-ethinyl-1,4,5-trimethylhexen-(4)-yl α-methylacetoacetate, $n_D^{20}$=1.4670, were obtained. 25 parts by weight of unchanged starting material were recovered from the sodium hydroxide solution extract. The yield of the methylation amounted to 96%.

*Pyrolysis.*—254 parts by weight of 1-ethinyl-1,4,5-trimethylhexen-(4)-yl α-methylacetoacetate together with 120 parts by weight of decalin and one part by weight of nicotinic acid were rapidly heated to 185–190° C. and held at this reaction temperature for 2 to 3 hours, whereupon about 0.8 mol of carbon dioxide split off. The decalin and volatile byproducts were separated by distillation in a small column under water vacuum and crude 3,6,9,10 - tetramethyl-undecatrien-(3,5,9)-one-(2) was obtained by high vacuum distillation without a column in the boiling range 100 to 130° C./0.1 mm. 154 parts by weight of a light oil was obtained, $n_D^{20}$=1.5176, with ultraviolet absorption maximum at 293 mµ, $E_1^1$=660 (in ethanol). The crude product is 57% pure on the basis of ultraviolet absorption measurements. The yield of the pyrolysis step amounted to 40%.

*Purification.*—By proceeding exactly as described in

Example 1, pure 3,6,9,10 - tetramethyl - undecatrien-(3,5,9)-one-(2), boiling point 100–103° C./0.01 mm., $n_D^{20}=1.5300$ with ultraviolet absorption maximum at 294 mμ, $E_1^1=1150$ (in ethanol), was obtained by the production and splitting of the semicarbazone which had an unsharp melting point at 170–194° C. as a mixture of different stereoisomers.

*Cyclization.*—Cyclization of 3,6,9,10-tetramethyl-undecatrien-(3,5,9)-one-(2) was effected by following the procedure described in Example 1. By treatment with sulfuric acid there was obtained as the principal product 4-[2′,5′,6′,6′-tetramethyl - cyclohexen-(1′)-yl]-3-methyl-buten-(3)-one-(2) and by treatment with boron trifluoride or phosphoric acid, respectively, there was obtained 4-[2′,5′,6′,6′ - tetramethylcyclohexen-(2′)-yl]-3-methyl-buten-(3)-one-(2).

*Example 4.—4 - [2′,6′,6′-trimethylcyclohexenyl]-3-propylbuten-(3)-one-(2)*

*Partial hydrogenation.*—23.2 grams of 3-allyl-6,10-dimethyl-undecatrien-(3,5,9)-one-(2) (produced according to the method described in Example 2 by alkylation, pyrolysis and purification), were hydrogenated under normal conditions in 100 cc. of petroleum ether (50–70°) and in the presence of one gram of palladium-calcium carbonate catalyst [5% palladium partially poisoned by lead, Helvetica Chimica Acta, 35, 446 (1952)]. After the absorption of 2.24 liters of hydrogen, the hydrogen absorption terminated. The mixture was separated from the catalyst by filtration, evaporated and distilled. There were obtained 23 grams of 3-propyl-6,10-dimethyl-undecatrien - (3,5,9) - one - (2), $n_D^{20}=1.5100$, boiling point$_{0.05}=88°$, ultraviolet absorption maximum at 295 mμ, $E_1^1=900$.

*Cyclization with sulfuric acid.*—10 grams of 3-propyl-6,10-dimethyl-undecatrien-(3,6,9)-one-(2) were dissolved in 10 cc. of petroleum ether and dropped into a mixture of 15 cc. of glacial acetic acid and 34 grams of concentrated sulfuric acid while stirring at −5°. The mixture was stirred 15 minutes at −5°, 20 minutes at +10°, and then poured onto crushed ice. The mixture was extracted with petroleum ether, the extract was washed to the neutral point, dried and evaporated. By distillation there were obtained 7.4 grams of cyclization product, $n_D^{20}=1.4974$, boiling point$_{0.05}=65-68°$, comprising as principal product 4-[2′,6′,6′-trimethylcyclohexen-(1′)-yl]-3-propylbuten-(3)-one-(2), semicarbazone melting point 146–148°.

*Cyclization with phosphoric acid.*—10 grams of 3-propyl-6,10-dimethyl-undecatrien - (3,6,9)-one-(2) were cyclized in the same manner as described in Example 2. There were obtained 8.5 grams of cyclization product comprising principally 4-[2′,6′,6′-trimethylcyclohexen-(2′)-yl]-3-propylbuten-(3)-one-(2), $n_D^{20}=1.4980$, boiling point$_{0.03}=63°$, semicarbazone melting point 169–170°.

In similar manner, from 1-ethinyl-1,4,5-trimethyl-hexen-(4)-yl acetoacetate was obtained 4-[2′,5′,6′,6′-tetramethylcyclohexen - (2′)-yl]-3-propylbuten-(3)-one-(2), boiling point$_{0.05}=74°$, $n_D^{20}=1.4975$, semicarbazone melting point=188–190°.

We claim:
1. A compound having the formula

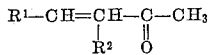

wherein $R^1$ represents a radical selected from the group consisting of 2′,6′,6′-trimethylcyclohexen-(2′)-yl and 2′,5′,6′,6′-tetramethyl-cyclohexen-(2′)-yl, and $R^2$ represents an unsaturated acyclic hydrocarbon radical of three carbon atoms.

2. 4 - [2′,6′,6′ - trimethyl - cyclohexen-(2′)-yl]-3-propargylbuten-(3)-one-(2).

3. 4 - [2′,6′,6′ - trimethyl-cyclohexen-(2′)-yl]-3-allyl-buten-(3)-one-(2).

4. 4 - [2′,5′,6′,6′ - tetramethyl-cyclohexen-(2′)-yl]-3-allyl-buten-(3)-one-(2).

5. A process which comprises heating an αsubstituted acetoacetate having the general formula

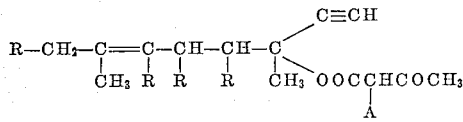

wherein R represents a member selected from the group consisting of hydrogen and a methyl group and at least 3 of the groups represented by R denote hydrogen, and A represents a radical having not more than three carbon atoms selected from the group consisting of alkyl radicals and alkenyl radicals, in an inert solvent in the presence of a weak carboxylic acid at 175–190° C., thereby effecting liberation of $CO_2$ and rearrangement and producing a ketone having the formula

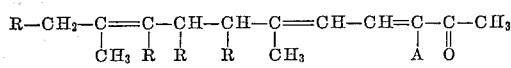

wherein the R's and A have the same meaning as above.

References Cited in the file of this patent

UNITED STATES PATENTS 2,661,368   Kimel et al. _____ Dec. 1, 1953
2,740,817   Naves _____ Apr. 3, 1956

OTHER REFERENCES

West et al.: Synthetic Perfumes, pp. 175–177 (1949).
Wagner et al.: Synthetic Organic Chemistry, pp. 327, 346, 347 (1953).
Lacey: J. Chem. Soc. (London), 1954, pp. 827–832.

UNITED STATES PATENT OFFICE

Certificate of Correction

Patent No. 2,898,375

August 4, 1959

Waldemar Guex et al.

It is hereby certified that error appears in the printed specification of the above numbered patent requiring correction and that the said Letters Patent should read as corrected below.

Column 2, line 53, for "three" read —there—; columns 3 and 4, Table I, under the heading "$n_D^{20}$" fourth and fifth listings, for

| 1,5345 | read | 1.5345 |
|---|---|---|
| 1,5100 | | 1.5100 | same column, Table II, under the heading "No.", the first brace should be reversed; same table, under the heading "$n_D^{20}$", third, sixth, and seventh listings, for

| 1,5154 | read | 1.5154 |
|---|---|---|
| 1,5050 | | 1.5050 |
| 1,5001 | | 1.5001 | column 3, line 73, for "disoslved" read —dissolved—; column 4, line 72, for "1,5332" read —1.5332—; column 5, line 4, for "(2)-" read —(2)—; line 15, for "produce" read —product—; line 17, for "point$_{0.5}$" read —point$_{0.05}$—; line 63, for "yl- α" read —yl α—.

Signed and sealed this 19th day of January 1960.

[SEAL]

Attest:
KARL H. AXLINE,
Attesting Officer.

ROBERT C. WATSON,
Commissioner of Patents.